(12) United States Patent
Wang et al.

(10) Patent No.: US 11,991,091 B2
(45) Date of Patent: May 21, 2024

(54) NETWORK RESOURCE PRE-ALLOCATION METHOD, DEVICE, AND SYSTEM, AND MEDIUM

(71) Applicant: CHINA TELECOM CORPORATION LIMITED, Beijing (CN)

(72) Inventors: Danmo Wang, Beijing (CN); Biao Long, Beijing (CN); Yue Sun, Beijing (CN); Jiayifan Liu, Beijing (CN); Liu Liu, Beijing (CN); Mingxue Li, Beijing (CN); Ke Yin, Beijing (CN); Linfeng Zhang, Beijing (CN); Qingyang Wang, Beijing (CN); Bo Wang, Beijing (CN); Ye Zhao, Beijing (CN); Lei Cao, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 0 days.

(21) Appl. No.: 17/921,252

(22) PCT Filed: Apr. 25, 2021

(86) PCT No.: PCT/CN2021/089722
§ 371 (c)(1),
(2) Date: Oct. 25, 2022

(87) PCT Pub. No.: WO2021/218873
PCT Pub. Date: Nov. 4, 2021

(65) Prior Publication Data
US 2023/0188475 A1 Jun. 15, 2023

(30) Foreign Application Priority Data
Apr. 27, 2020 (CN) .......................... 202010344798.7

(51) Int. Cl.
*H04L 47/80* (2022.01)
*H04L 47/83* (2022.01)

(52) U.S. Cl.
CPC ............ *H04L 47/805* (2013.01); *H04L 47/83* (2022.05)

(58) Field of Classification Search
CPC ..... H04L 47/805; H04L 47/83; H04L 47/823; H04W 72/04
See application file for complete search history.

(56) References Cited

U.S. PATENT DOCUMENTS

2020/0045559 A1 2/2020 Kim et al.
2021/0204154 A1* 7/2021 Li ....................... H04L 41/5054
(Continued)

FOREIGN PATENT DOCUMENTS

CN 110912723 A 3/2020
CN 111614563 A 9/2020
(Continued)

OTHER PUBLICATIONS

International Search Report dated Jul. 20, 2021 in corresponding Application No. PCT/CN2021/089722; 2 pages.
(Continued)

*Primary Examiner* — Jungwon Chang
(74) *Attorney, Agent, or Firm* — Andrew M. Calderon; Calderon Safran & Cole, P.C.

(57) ABSTRACT

This disclosure provides a network resource pre-allocation method, device, system, and medium, wherein the method includes: an NWDAF acquiring historical record information of a user accessing a service, and generating user service preference prediction and suggestion information according to the historical record information; and the NWDAF sending the user service preference prediction and suggestion information to a network function (NF) so that (Continued)

the NF pre-allocates a network resource according to the user service preference prediction and suggestion information.

9 Claims, 4 Drawing Sheets

(56) References Cited

U.S. PATENT DOCUMENTS

| | | | | |
|---|---|---|---|---|
| 2021/0219179 A1* | 7/2021 | Narath | ................... | H04W 76/10 |
| 2021/0250251 A1* | 8/2021 | Fan | ......................... | H04L 41/14 |
| 2021/0368514 A1* | 11/2021 | Xing | ..................... | H04W 24/02 |
| 2021/0392540 A1* | 12/2021 | Chong | .............. | H04W 28/0268 |
| 2022/0164593 A1* | 5/2022 | Singla | ................... | H04L 47/823 |

FOREIGN PATENT DOCUMENTS

| | | |
|---|---|---|
| EP | 3821623 A1 | 5/2021 |
| EP | 3843333 A | 6/2021 |

OTHER PUBLICATIONS

Catt, "Solution for NWDAF assisted Handover decision", SA WG2 Meeting #127 S2-183684, 2018年 4月 20日 (Apr. 20, 2018), 3 pages.

\* cited by examiner

NETWORK RESOURCE PRE-ALLOCATION METHOD, DEVICE, AND SYSTEM, AND MEDIUM

CROSS-REFERENCE TO RELATED APPLICATIONS

This disclosure is based on and claims the priority to the Chinese patent application No. 202010344798.7 filed on Apr. 27, 2020, the disclosure of which is hereby incorporated in its entirety into the present disclosure.

TECHNICAL FIELD

This disclosure relates to the field of communication technology, and particularly, to a network resource pre-allocation method, device, system, and medium.

BACKGROUND

An NWDAF (Network Data Analysis Function) is a core function implemented in 5G network automation, which enables the 5G network to be more intelligent and flexible by acquiring network data and providing data analysis results to the 5G network.

SUMMARY

According to a first aspect of the present disclosure, there is provided a network resource pre-allocation method, comprising: the network data analysis function (NWDAF) acquiring historical record information of a user accessing a service, and generating user service preference prediction and suggestion information according to the historical record information; and the NWDAF sending the user service preference prediction and suggestion information to a network function (NF) so that the NF pre-allocates a network resource according to the user service preference prediction and suggestion information.

In some embodiments, the NWDAF receives a subscription request message sent by the NF network element; and the NWDAF sends the user service preference prediction and suggestion information to the NF according to the subscription request.

In some embodiments, information carried by the subscription request message comprises service experience information and service behavior information; the service experience information comprises quality of experience (QoE), RAT, and frequency information; and the service behavior information comprises time of the user accessing the service, location information, and a service type.

In some embodiments, the generating user service preference prediction information according to the historical record information comprises: the NWDAF acquiring preset user parameter information, grouping users based on the user parameter information and generating a plurality of groups; the NWDAF acquiring service preference information corresponding to the group users; and the NWDAF acquiring statistic and prediction information of the user service preference according to the historical record information and the service preference information.

In some embodiments, the user service preference prediction and suggestion information comprises a service that the user will use in a future time period, and suggestion information for a radio access technology (RAT) type or frequency used for this service.

In some embodiments, the NF comprises: a policy control function (PCF); the NWDAF receiving a subscription request message sent by the NF comprises: the NWDAF receiving the subscription request message sent by the PCF; and the NWDAF sending the user service preference prediction and suggestion information to the NF according to the subscription request comprises: the NWDAF sending the user service preference prediction and suggestion information to the PCF.

In some embodiments, the PCF outputs a corresponding RFSP parameter to an access and mobility management function (AMF) based on the received user service preference prediction and suggestion information; and the AMF sends the RFSP parameter to a RAN-side node so that the RAN-side node performs radio network resource pre-allocation processing based on the RFSP parameter.

In some embodiments, the user parameter information comprises one or more of gender, user rating, education level, age and occupation.

In some embodiments, the NWDAF acquiring historical record information of a user accessing a service comprises: the NWDAF acquiring the historical record information of the user accessing the service from a data source, wherein the data source comprises: an operation and maintenance (OAM) system and the NF network element.

According to a second aspect of the present disclosure, there is provided a network data analysis function device, comprising: an information acquisition module configured to acquire historical record information of a user accessing a service; a prediction generation module configured to generate user service preference prediction and suggestion information according to the historical record information; and a prediction sending module configured to send the user service preference prediction and suggestion information to a network function (NF) so that the NF pre-allocates a network resource according to the user service preference prediction and suggestion information.

In some embodiments, a subscription receiving module is configured to receive a subscription request message sent by the NF network element; and the prediction sending module is configured to send the user service preference prediction and suggestion information to the NF according to the subscription request.

In some embodiments, information carried by the subscription request message comprises service experience information and service behavior information; the service experience information comprises quality of experience (QoE), RAT, and frequency information; and the service behavior information comprises time of the user accessing the service, location information, and a service type.

In some embodiments, the prediction generation module is configured to acquire preset user parameter information, group users based on the user parameter information, and generate a plurality of groups; acquire service preference information corresponding to the group users; and obtain statistic and prediction information of the user service preference according to the historical record information and the service preference information.

In some embodiments, the user service preference prediction and suggestion information comprises a service that the user will use in a future time period, and suggestion information of a radio access technology (RAT) type or frequency used for this service.

In some embodiments, the NF comprises: a policy control function (PCF); the subscription receiving module is configured to receive the subscription request message sent by the PCF; and the prediction sending module is configured to send the user service preference prediction and suggestion information to the PCF.

In some embodiments, the user parameter information comprises one or more of gender, user rating, education level, age and occupation.

In some embodiments, the information acquisition module is configured to acquire the history record information of the user accessing the service from a data source, wherein the data source comprises: an operation and maintenance (CAM) system and the NF network element.

According to a third aspect of the present disclosure, there is provided a network data analysis function device, comprising: a processor; and a memory coupled to the processor, storing program instructions which, when executed by the processor, cause the processor to: acquire historical record information of a user accessing a service, and generate user service preference prediction and suggestion information according to the historical record information; and send the user service preference prediction and suggestion information to a network function (NF) so that the NF pre-allocates a network resource according to the user service preference prediction and suggestion information.

According to a fourth aspect of the present disclosure, there is provided a network resource pre-allocation system, comprising: an NF and an NWDAF, wherein the NWDAF is configured to: acquire historical record information of a user accessing a service, and generate user service preference prediction and suggestion information according to the historical record information; and send the user service preference prediction and suggestion information to a network function (NF) so that the NF pre-allocates a network resource according to the user service preference prediction and suggestion information.

According to a fifth aspect of the present disclosure, there is provided a non-transitory computer-readable storage medium having stored thereon computer instructions which, when executed by one or more processors, cause the one or more processors to: acquire historical record information of a user accessing a service, and generate user service preference prediction and suggestion information according to the historical record information; and send the user service preference prediction and suggestion information to a network function (NF) so that the NF pre-allocates a network resource according to the user service preference prediction and suggestion information.

BRIEF DESCRIPTION OF THE DRAWINGS

In order to more clearly illustrate the embodiments of the present disclosure or technical solutions in the related art, the drawings that need to be used in the description of the embodiments or related art will be briefly described below, it is obvious that the drawings in the description below are only some embodiments of the present disclosure, and for one of ordinary skill in the art, other drawings can be obtained according to the drawings without paying creative efforts.

DETAILED DESCRIPTION

The present disclosure will be described more fully below with reference to the accompanying drawings, in which exemplary embodiments of the present disclosure are shown. Technical solutions in the embodiments of the present disclosure will be described clearly and completely in conjunction with the drawings in the embodiments of the present disclosure, and it is obvious that the embodiments described are only some embodiments of the present disclosure, rather than all embodiments. All other embodiments, which can be derived by one of ordinary skill in the art from the embodiments in the present disclosure without making any creative effort, shall fall within the scope of protection of the present disclosure. The technical solutions of the present disclosure will be described in many aspects below in conjunction with various drawings and embodiments.

In the related art known to inventors, there are problems such as inflexible network resource allocation, waste of network resource in a network system, and how to effectively improve a utilization rate of the network resource is one of the problems to be addressed at present. In view of this, the embodiments of the present disclosure provide a network resource pre-allocation method, device, system, and medium, in which user service preference prediction and suggestion information is generated according to historical record information, and an NF pre-allocates a network resource according to the user service preference prediction and suggestion information, and can pre-allocate the network resource for a predicted service, and then make minor modifications according to an actual situation to ensure user application experience, thereby reducing pressure of the network load and effectively utilizing the network resource.

Figure 1:
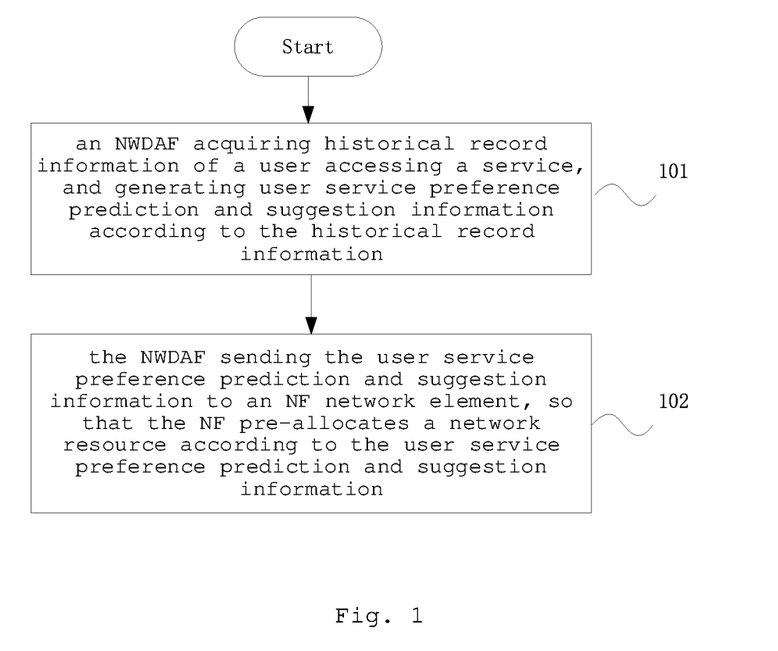
FIG. 1 is a schematic flow diagram of a network resource pre-allocation method according to some embodiments of the present disclosure.

FIG. 1 is a schematic flow diagram of a network resource pre-allocation method according to some embodiments of the present disclosure, as shown in FIG. 1:

step 101, an NWDAF acquiring historical record information of a user accessing a service, and generating user service preference prediction and suggestion information according to the historical record information. There can be various kinds of services, such as voice service, video service, and the like.

Step 102, the NWDAF sending the user service preference prediction and suggestion information to an NF (Network Function) network element, so that the NF pre-allocates a network resource according to the user service preference prediction and suggestion information.

The NF comprises an AMF (Access and Mobility Management Function), an SMF (Session Management Function), a PCF (Policy Control Function), an NRF (NF Repository Function), and the like, and the network resource comprises a resource such as frequency, bandwidth, and the like.

The user service preference prediction and suggestion information comprises a service that the user will use in a future time period (i.e. a service that the user will very probably use in a future time period), and suggestion information for a RAT (Radio Access Technology) type or frequency used for this service, etc.; and the user service preference prediction and suggestion information can also comprises a user ID (e.g., a cellphone number, etc.), time and location of service usage, etc.

The existing network has multi-frequency multi-access networking modes, and faces problems such as inflexible network resource allocation, waste of network resource and the like, and under the condition of limited network resource, how to effectively improve a utilization rate of the network resource is one of the problems to be addressed at present. According to the network resource pre-allocation method of the present disclosure, the NWDAF can, by performing big data analysis on different user parameter information, obtain corresponding user service preference prediction and suggestion information, to assist in making an RAT or frequency selection policy.

The NWDAF acquires the historical record information of the user accessing the service from a data source, wherein the data source comprises an operation and maintenance (OAM) system, the NF and the like. The NWDAF can acquire the historical record information of the user accessing the service that is provided by the AMF, SMF, PCF, OAM system, etc.

Figure 2:
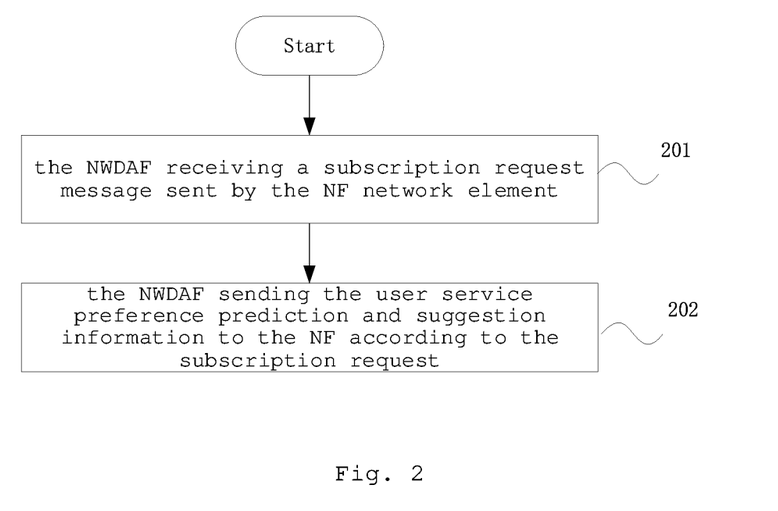
FIG. 2 is a schematic flow diagram of subscribing information in a network resource pre-allocation method according to some embodiments of the present disclosure.

FIG. 2 is a schematic flow diagram of subscribing information in a network resource pre-allocation method according to some embodiments of the present disclosure, as shown in FIG. 2:

step 201, the NWDAF receiving a subscription request message sent by the NF network element.

Step 202, the NWDAF sending the user service preference prediction and suggestion information to the NF according to the subscription request.

Information carried by the subscription request message comprises service experience information, service behavior information, and the like; the service experience information comprises quality of experience (QoE), RAT and frequency information; the service behavior information comprises time of the user accessing the service, location information, a service type and the like; and the NWDAF can use the existing method or model, take the service experience information, the service behavior information and the like as auxiliary analysis information, and generate the user service preference prediction and suggestion information according to the historical record information.

Figure 3:
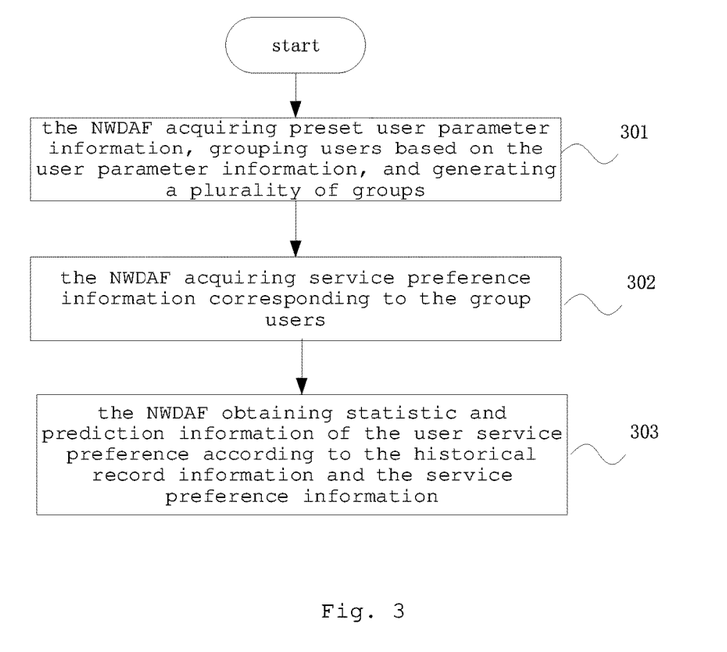
FIG. 3 is a schematic flow diagram of generating user service preference prediction and suggestion information in a network resource pre-allocation method according to some embodiments of the present disclosure.

Various methods can be employed to generate the user service preference prediction information based on the historical record information. FIG. 3 is a schematic flow diagram of generating user service preference prediction and suggestion information in a network resource pre-allocation method according to some embodiments of the present disclosure, as shown in FIG. 3:

step 301, the NWDAF acquiring preset user parameter information, grouping users based on the user parameter information, and generating a plurality of groups.

The user parameter information comprises one or more of gender, user rating, education level, age, occupation. The gender is to classify users of different genders; the user rating is to classify users according to ratings such as gold card, silver card and the like; the education level is to classify users with different education levels; the age is to classify users of different age groups; and the occupation is to classify users of different occupations.

Step 302, the NWDAF acquiring service preference information corresponding to the group users; and the service preference information is used for characterizing preference information of different group users for different services.

Step 303, the NWDAF obtaining statistic and prediction information of the user service preference according to the historical record information and the service preference information. The user service preference prediction and suggestion information can be generated based on the statistic and prediction information of the user service preference.

The NWDAF can divide the users into different groups based on the above user parameter information, and provide corresponding user service preference prediction and suggestion information to users in different groups. According to the historical record information and the service preference information, the NWDAF obtains the probability information of the users using the service that corresponds to the group users in the future time period, and the suggestion information of the RAT type or frequency of the users using the service in the future time period, to generates the user service preference prediction and suggestion information.

The NWDAF can apply big data analysis technology to assist in acquiring the user service preference prediction and RAT or frequency selection suggestion based on the user parameter information. The NWDAF acquires historical records of the user accessing the service, group the users according to the user parameter information, and obtain the user service preference prediction and suggestion information by performing big data analysis on the historical records of the user accessing the service and the application preference of different group users, wherein the user service preference prediction and suggestion information comprises the probability of the user using the specific service and the corresponding RAT and frequency selection suggestion.

The NF can pre-allocate a network resource for a predicted service according to the user service preference prediction and suggestion information, and then make minor modifications according to an actual situation to guarantee user application experience, so that the network flexibly responds to the needs and use of different group users, which can reduce pressure of the network load and effectively utilize the network resource.

In some embodiments, the NWDAF acquires the historical records of the user accessing the service, wherein the data acquisition can be performed by subscribing to data notifications about a series of events, to a relevant NF or OAM system. The NWDAF groups the users according to the user parameter information, for example, information of a user A is: female, age 31, journalist, working in a television station, gold card rating. Users whose information is similar to gender, user rating, education level, age, occupation, etc. in the information of the user A can be grouped into one same group, and the users in the one same group generally have similar service usage habits.

The NWDAF obtains the user service preference prediction and suggestion by performing big data analysis on the historical records of the user accessing the application and the application preference of different group users, and outputs an analysis result, wherein various existing algorithms and models can be used for performing big data analysis, such as a neural network model.

For example, the NWDAF acquires historical records of a user accessing a service, divides the users into different groups based on user parameter information, provides corresponding service preference prediction and suggestion to different group users, and by means of the big data analysis, assists in implementing the user service preference prediction and provides the RAT or frequency selection suggestion.

The NWDAF performs analysis by:

$$\vec{A} = \vec{u} \times \vec{V^T} \quad (1\text{-}1);$$

where $\vec{A}$ and $\vec{u}$ is known parameters and can be acquired from AF or NEF, and $\vec{V^T}$ is unknown and needs to be calculated by a specific algorithm according to the above equation 1-1.

$\vec{A}$ is a matrix indicating a user accessing a service (i.e. a user term matrix), i.e. historical record information of group users accessing a service:

$$\vec{A} = \begin{pmatrix} 0 & 1 & 0 & 1 \\ & & \cdots & \\ 1 & 1 & 1 & 0 \\ \vdots & & \ddots & \vdots \\ 0 & 0 & 1 & 1 \\ & & \cdots & \\ 1 & 0 & 1 & 0 \end{pmatrix}$$

where a column of the matrix $\vec{A}$ represents a user, a row of the matrix $\vec{A}$ represents a historical record of the user accessing a service, 1 or 0 represents whether the user uses the service, and the row of $\vec{A}$ can also be frequency of the user using the service.

$\vec{u}$ is a matrix indicating user profile, i.e., service preference information:

$$\vec{u} = \begin{pmatrix} u & u & u & u \\ & & \cdots & \\ u & u & u & u \\ \vdots & & \ddots & \vdots \\ u & u & u & u \\ & & \cdots & \\ u & u & u & u \end{pmatrix}$$

where a column of the matrix $\vec{u}$ represents user profile (user parameter information, for example, gender, category/rating, education level, age, occupation, etc.), and a row of the matrix $\vec{u}$ represents a preference for the users using the service corresponding to a specific user profile (for characterizing a preference of the user for the service).

$V^T$ is an intermediate result:

$$\vec{V^T} = \begin{pmatrix} v & v & v & v \\ & & \cdots & \\ v & v & v & v \\ \vdots & & \ddots & \vdots \\ v & v & v & v \\ & & \cdots & \\ v & v & v & v \end{pmatrix}$$

By $\vec{V^T}$ and the specific user profile $\vec{u}$, the NWDAF can provide the service preference suggestion $\vec{u_+^T}$ using the following equation:

$$\vec{u_+^T} = \vec{u} \times \vec{V^T} \quad (1\text{-}2);$$

The matrix indicating the user accessing the service (the user service preference prediction and suggestion information) is:

$$\vec{u_+^T} = \begin{pmatrix} u \\ 1 \\ \vdots \\ 1 \\ 1 \end{pmatrix}$$

A column of the matrix $\vec{u_+^T}$ represents a service preference suggestion on a possibility (probability) of the user using the specific service, and a suggestion on which frequency or RAT to select.

In some embodiments, the user service preference prediction and suggestion information comprises: a service that the user will very probably use in a certain future time period, and a prediction/suggestion on a RAT/frequency capable of meeting the needs of such service and needing to be resided. For example, for the user A, an NWDAF performs analysis on input information to obtain user service preference prediction and suggestion information, predicts that the user A will probably use a voice service in a certain area on Friday morning, and a corresponding network function (e.g., PCF) will prepare to guide or switch a network of the user A in advance based on the prediction.

The NWDAF receives a subscription request message sent by the PCF, and according to the subscription request, sends the user service preference prediction and suggestion information to the PCF. The PCF outputs a corresponding RFSP (RAT/Frequency Selection Priority) parameter to the access and mobility management function (AMF) based on the received user service preference prediction and suggestion information; and the AMF sends the RFSP parameter to a RAN-side node, so that the RAN-side node performs radio network resource pre-allocation processing based on the RFSP parameter.

The NWDAF outputs the user service preference prediction and suggestion information to the PCF subscribing to the service, then the corresponding RFSP parameter is output by the PCF based on the user service preference prediction and suggestion information, and finally the RFSP parameter is transmitted to the RAN-side node through the AMF for performing wireless network management to pre-allocate the network resource, wherein the allocable network resource comprise wireless network bandwidth and the like.

Figure 4:
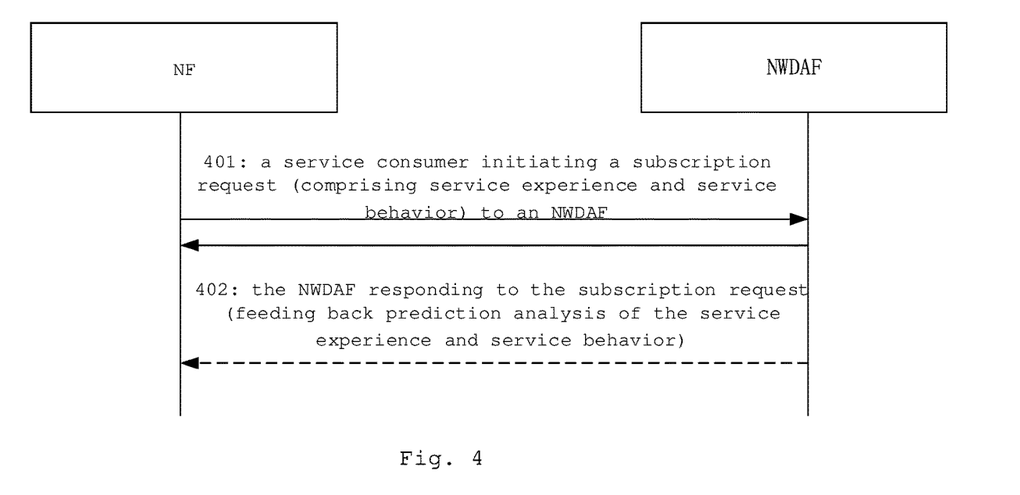
FIG. 4 is a schematic flow diagram of subscribing information in a network resource pre-allocation method according to other embodiments of the present disclosure.

FIG. 4 is a schematic flow diagram of subscribing information in a network resource pre-allocation method according to other embodiments of the present disclosure, as shown in FIG. 4:

step 401, a service consumer (NF network element) initiating a subscription request to an NWDAF.

Step 402, the NWDAF responding to the subscription request.

A trigger condition of the subscription request comprises: detecting the use of a certain application in a certain time period, or detecting that a user enters a certain area (area of interest), etc. In the process that the NF initiates subscription to the NWDAF, analytics ID, which is service experience and service behavior, is added into input information, wherein the service experience and the service behavior are used for the NWDAF to output auxiliary analysis information related to the user service preference prediction and RAT or frequency selection suggestion. The NWDAF can use an existing method or model, take the service experience information, the service behavior information, and the like as auxiliary analysis information, and generate the user service preference prediction and suggestion information according to historical record information.

The service experience can be QoE (quality of experience, which is user experience or user perception, i.e., subjective feeling of an end user on service performance provided by a mobile network) of the service, or an MOS value (an important index for measuring voice quality of a communication system) of the service, and RAT and frequency information; and the service behavior is: information of a location where the user uses the service (for example, a time period when staying in a specific area) and relevant information of the used service (start and stop time of using the service, data rates of uplink and downlink when using the service) and a service type, and the analytics ID can be the service experience and the signaling can be the analytics ID.

In the process of the NWDAF returning a notification to the service consumer (NF network element), the NWDAF feeds back the user service preference prediction and suggestion information obtained through big data analysis. The NWDAF can provide two services:
Nnwdaf_AnalyticsSubscription (the service includes service operations for subscription, de-subscription and notification), and
Nnwdaf_AnalyticsInfo (the service includes service operations for request and response).

Figure 5:
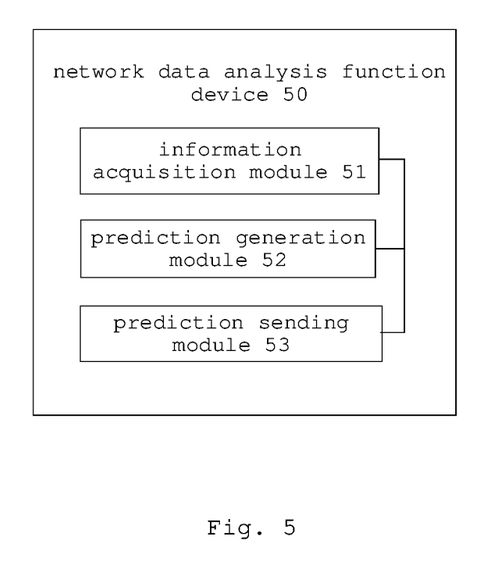
FIG. 5 is a schematic block diagram of a network data analysis function device according to some embodiments of the present disclosure.

In some embodiments, as shown in FIG. 5, the present disclosure provides a network data analysis function (NWDAF) device 50, comprising: an information acquisition module 51, a prediction generation module 52 and a prediction sending module 53. The information acquisition module 51 acquires historical record information of a user accessing a service; the information acquisition module 51 can acquire the historical record information of the user accessing the service from a data source, wherein the data source comprises an operation and maintenance (CAM) system, an NF network element, and the like.

The prediction generation module 52 generates user service preference prediction and suggestion information according to the historical record information. The prediction sending module 53 sends the user service preference prediction and suggestion information to the network function (NF) network element, so that the NF pre-allocates a network resource according to the user service preference prediction and suggestion information.

Figure 6:
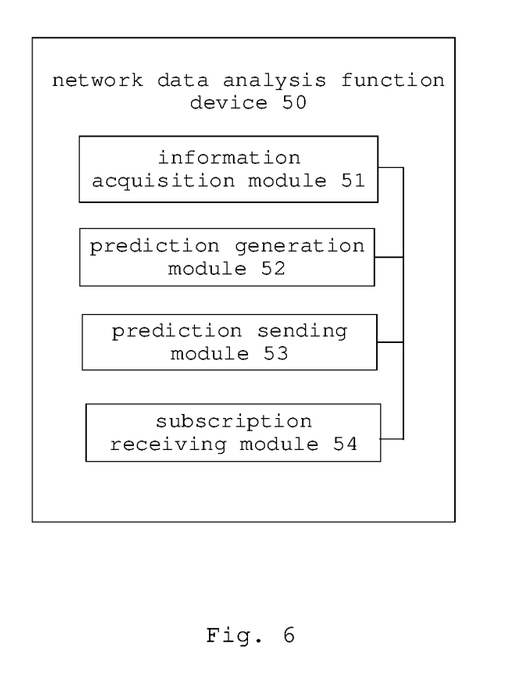
FIG. 6 is a schematic block diagram of a network data analysis function device according to other embodiments of the present disclosure.

In some embodiments, as shown in FIG. 6, the network data analysis function device 50 further comprises a subscription receiving module 54, wherein the subscription receiving module 54 receives a subscription request message sent by the NF network element. The prediction sending module 53 sends the user service preference prediction and suggestion information to the NF according to the subscription request. Information carried by the subscription request message comprises service experience information and service behavior information; wherein the service experience information comprises quality of experience (QoE); and the service behavior information comprises time and location information of the user accessing the service.

The NF comprises a policy control function (PCF); and the subscription receiving module 54 receives the subscription request message sent by the PCF, and the prediction sending module 53 sends the user service preference prediction and suggestion information to the PCF.

The prediction generation module 53 acquires preset user parameter information, groups users based on the user parameter information, and generates a plurality of groups; wherein the user parameter information comprises: gender, user rating, education level, age, occupation. The prediction generation module 53 acquires service preference information corresponding to group users, and acquires user service preference prediction and suggestion information according to the historical record information and the service preference information; and the user service preference prediction and suggestion information comprises a service that the user will use in a future time period, and suggestion information of a RAT type or frequency used for this service.

Figure 7:
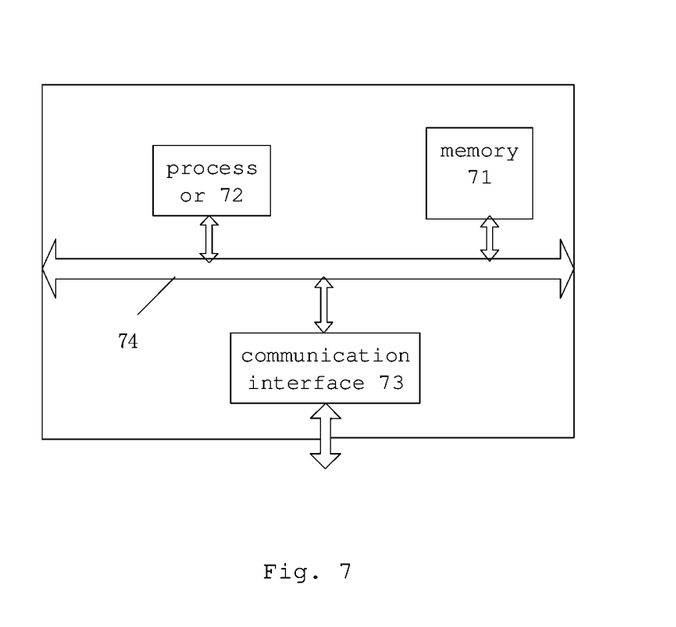
FIG. 7 is a schematic block diagram of a network data analysis function device according to still other embodiments of the present disclosure.

FIG. 7 is a schematic block diagram of a network data analysis function device according to still other embodiments of the present disclosure. As shown in FIG. 7, the device can comprise a memory 71, a processor 72, a communication interface 73, and a bus 74. The memory 71 is configured to store instructions, and the processor 72 is coupled to the memory 71, the processor 72 being configured to implement, based on the execution of the instructions stored in the memory 71, the network resource pre-allocation method described above.

The memory 71 can be a high-speed RAM memory, a non-volatile memory, or the like, and the memory 71 can be a memory array. The storage 71 can also be partitioned into blocks, and the blocks can be combined into a virtual volume according to a certain rule. The processor 72 can be a central processing unit (CPU), or an application specific integrated circuit (ASIC), or one or more integrated circuits configured to implement the network resource pre-allocation method of the present disclosure.

Figure 8:
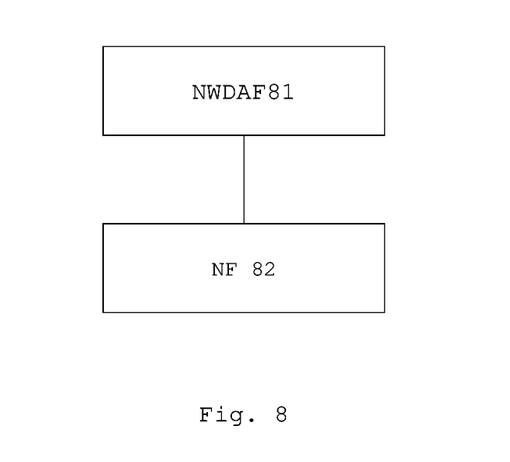
FIG. 8 is a schematic block diagram of a network resource pre-allocation system according to some embodiments of the present disclosure.

In some embodiments, as shown in FIG. 8, the present disclosure provides a network resource pre-allocation system, comprising an NF 81 and an NWDAF 82, wherein the NWDAF 82 is configured to perform the network resource pre-allocation method according to any of the above embodiments.

In some embodiments, the present disclosure provides a computer-readable storage medium having stored thereon computer instructions which, when executed by a processor, perform the network resource pre-allocation method according to any of the above embodiments.

It should be appreciated by those skilled in the art that, the embodiments of the present disclosure can be provided as a method, system, or computer program product. Accordingly, the present disclosure can take a form of an entire hardware embodiment, an entire software embodiment or an embodiment combining software and hardware aspects. Furthermore, the present disclosure can take a form of a computer program product implemented on one or more computer-usable non-transitory storage media (including, but not limited to, disk memories, CD-ROMs, optical memories, and so forth) having computer-usable program code embodied therein.

The present disclosure is described with reference to flow diagrams and/or block diagrams of the method, device (system) and computer program product according to the embodiments of the present disclosure. It should be understood that each flow and/or block in the flow diagrams and/or block diagrams, and a combination of flows and/or blocks in the flow diagrams and/or block diagrams, can be implemented by computer program instructions. These computer program instructions can be provided to a processor of a general-purpose computer, special-purpose computer, embedded processor, or other programmable data processing device to produce a machine, such that the instructions, which are executed through the processor of the computer or other programmable data processing devices, create means for implementing the functions specified in one or more flows of the flow diagrams and/or one or more blocks of the block diagrams.

These computer program instructions can also be stored in a computer-readable memory that can guide the computer or other programmable data processing devices to work in a specific manner, such that the instructions stored in the computer-readable memory produce an article of manufacture including instruction means which implement the functions specified in one or more flows of the flow diagrams and/or one or more blocks of the block diagrams.

According to the network resource pre-allocation method, device, system and medium in the above embodiments, the user service preference prediction and suggestion information are generated according to the historical record information, the NF pre-allocates the network resource according to the user service preference prediction and suggestion information, and can pre-allocate the network resource for a predicted service, and then makes minor modifications according to the actual situation to guarantee user application experience, so that the network flexibly responds to the needs and use of different group users, which can reduce pressure of the network load and effectively utilize the network resource; functional enhancement and expansion are performed based on functions of the existing NWDAF, so that the device is less transformed and easily implemented, which saves network service cost of an operator, and can improve the use experience of the user.

The method and system of the present disclosure can be implemented in a number of ways. For example, the method and system of the present disclosure can be implemented in software, hardware, firmware, or any combination of software, hardware, and firmware. The above order for the steps of the method is for illustration only, and the steps of the method of the present disclosure are not limited to the order specifically described above unless specifically stated otherwise. Furthermore, in some embodiments, the present disclosure can also be implemented as programs recorded in a recording medium, these programs including machine-readable instructions for implementing the method according to the present disclosure. Thus, the present disclosure also covers a recording medium storing the program for performing the method according to the present disclosure.

The description of the present disclosure has been given for purposes of example and description, and is not intended to be exhaustive or limit the present disclosure to the disclosed form. Many modifications and variations are apparent to one of ordinary skill in the art. The embodiments are chosen and described in order to better explain the principles and practical applications of the present disclosure, and to enable one of ordinary skill in the art to understand the present disclosure, so as to design various embodiments with various modifications that are suitable for a specific purpose.

What is claimed is:

1. A network resource pre-allocation method, comprising:
   a network data analysis function (NWDAF) acquiring historical record information of a user accessing a service, and generating user service preference prediction and suggestion information according to the historical record information;
   wherein the generating user service preference prediction and suggestion information according to the historical record information comprising:
   the NWDAF acquiring preset user parameter information, grouping users based on the user parameter information and generating a plurality of groups, wherein the user parameter information comprises gender, user rating, education level, age and occupation; the NWDAF acquiring service preference information corresponding to the group users; and the NWDAF acquiring statistic and prediction information of the user service preference according to the historical record information and the service preference information; and
   the NWDAF sending the user service preference prediction and suggestion information to a network function (NF) so that the NF pre-allocates a network resource according to the user service preference prediction and suggestion information; wherein;
   the service comprises voice service and video service; and the user service preference prediction and suggestion information comprises a service that the user will use in a future time period, and suggestion information for a radio access technology (RAT) type or frequency used for this service.

2. The method according to claim 1, further comprising:
   the NWDAF receiving a subscription request message sent by the NF network element; and
   the NWDAF sending the user service preference prediction and suggestion information to the NF according to the subscription request.

3. The method according to claim 2, wherein
   information carried by the subscription request message comprises service experience information and service behavior information; the service experience information comprises quality of experience (QoE), RAT, and frequency information; and the service behavior information comprises time of the user accessing the service, location information, and a service type.

4. The method according to claim 2, the NF comprising: a policy control function (PCF); the NWDAF receiving a subscription request message sent by the NF comprising:
   the NWDAF receiving the subscription request message sent by the PCF; and
   the NWDAF sending the user service preference prediction and suggestion information to the NF according to the subscription request comprising:
   the NWDAF sending the user service preference prediction and suggestion information to the PCF.

5. The method according to claim 4, further comprising:
   the PCF outputting a corresponding RFSP parameter to an access and mobility management function (AMF) based on the received user service preference prediction and suggestion information; and
   the AMF sending the RFSP parameter to a RAN-side node so that the RAN-side node performs radio network resource pre-allocation processing based on the RFSP parameter.

6. The method according to claim 1, the NWDAF acquiring historical record information of a user accessing a service comprising:
   the NWDAF acquiring the historical record information of the user accessing the service from a data source, wherein the data source comprises an operation and maintenance (OAM) system and the NF network element.

7. A network data analysis function (NWDAF) device, comprising:

a processor; and a memory coupled to the processor, storing program instructions which, when executed by the processor, cause the processor to:

acquire historical record information of a user accessing a service, and generate user service preference prediction and suggestion information according to the historical record information;

wherein the generating user service preference prediction and suggestion information according to the historical record information comprising:

the NWDAF acquiring preset user parameter information, grouping users based on the user parameter information and generating a plurality of groups, wherein the user parameter information comprises gender, user rating, education level, age and occupation; the NWDAF acquiring service preference information corresponding to the group users; and the NWDAF acquiring statistic and prediction information of the user service preference according to the historical record information and the service preference information; and send the user service preference prediction and suggestion information to a network function (NF) so that the NF pre-allocates a network resource according to the user service preference prediction and suggestion information; wherein;

the service comprises voice service and video service; and the user service preference prediction and suggestion information comprises a service that the user will use in a future time period, and suggestion information for a radio access technology (RAT) type or frequency used for this service.

8. A network resource pre-allocation system, comprising:
an NF and an NWDAF, wherein the NWDAF is configured to:

acquire historical record information of a user accessing a service, and generate user service preference prediction and suggestion information according to the historical record information;

wherein the generating user service preference prediction and suggestion information according to the historical record information comprising:

the NWDAF acquiring preset user parameter information, grouping users based on the user parameter information and generating a plurality of groups, wherein the user parameter information comprises gender, user rating, education level, age and occupation; the NWDAF acquiring service preference information corresponding to the group users; and the NWDAF acquiring statistic and prediction information of the user service preference according to the historical record information and the service preference information; and send the user service preference prediction and suggestion information to a network function (NF) so that the NF pre-allocates a network resource according to the user service preference prediction and suggestion information; wherein;

the service comprises voice service and video service; and the user service preference prediction and suggestion information comprises a service that the user will use in a future time period, and suggestion information for a radio access technology (RAT) type or frequency used for this service.

9. A non-transitory computer-readable storage medium having stored thereon computer instructions which, when executed by one or more processors, cause the one or more processors to:

acquire historical record information of a user accessing a service, and generate user service preference prediction and suggestion information according to the historical record information;

wherein the generating user service preference prediction and suggestion information according to the historical record information comprising:

the NWDAF acquiring preset user parameter information, grouping users based on the user parameter information and generating a plurality of groups, wherein the user parameter information comprises gender, user rating, education level, age and occupation; the NWDAF acquiring service reference information corresponding to the group users; and the NWDAF acquiring statistic and prediction information of the user service preference according to the historical record information and the service preference information; and send the user service preference prediction and suggestion information to a network function (NF) so that the NF pre-allocates a network resource according to the user service preference prediction and suggestion information; wherein;

the service comprises voice service and video service; and the user service preference prediction and suggestion information comprises a service that the user will use in a future time period, and suggestion information for a radio access technology (RAT) type frequency used for this service.

* * * * *